(12) United States Patent
Carlson et al.

(10) Patent No.: US 12,369,573 B2
(45) Date of Patent: Jul. 29, 2025

(54) SPRING-FREE FLOATING DEVICE FOR LOCKING ABOUT A FISHING LINE

(71) Applicants: Edward Scott Carlson, Delmont, PA (US); Charles A. Lanager, Greensburg, PA (US)

(72) Inventors: Edward Scott Carlson, Delmont, PA (US); Charles A. Lanager, Greensburg, PA (US)

( * ) Notice: Subject to any disclaimer, the term of this patent is extended or adjusted under 35 U.S.C. 154(b) by 0 days.

(21) Appl. No.: 18/237,355

(22) Filed: Aug. 23, 2023

(65) Prior Publication Data

US 2024/0065245 A1   Feb. 29, 2024

Related U.S. Application Data

(60) Provisional application No. 63/400,225, filed on Aug. 23, 2022.

(51) Int. Cl.
*A01K 93/00* (2006.01)
*A01K 91/047* (2006.01)

(52) U.S. Cl.
CPC ............ *A01K 91/047* (2013.01); *A01K 93/00* (2013.01)

(58) Field of Classification Search
CPC ........ A01K 93/00; A01K 91/03; A01K 91/04; A01K 95/02; A01K 91/047
USPC ... 43/43.1, 44.87, 44.9, 44.91, 44.92, 44.93, 43/44.95; 24/115 R, 135 R, 135 A; 42/115 R, 135 R, 135 A
See application file for complete search history.

(56) References Cited

U.S. PATENT DOCUMENTS

| | | | | |
|---|---|---|---|---|
| 2,465,064 A | * | 3/1949 | Colosimo | A01K 85/16 43/42.34 |
| 2,895,255 A | * | 7/1959 | Basil | A01K 93/00 43/44.88 |
| 3,020,670 A | * | 2/1962 | Lockhart | A01K 93/00 43/44.91 |
| 3,041,695 A | * | 7/1962 | Ouellette | A01K 91/04 403/301 |
| 3,744,176 A | * | 7/1973 | Bondhus | A01K 93/00 43/44.87 |
| 3,866,346 A | * | 2/1975 | Schneider | A01K 93/00 43/44.87 |
| 3,990,172 A | * | 11/1976 | Hagquist | A01K 93/00 43/44.87 |
| 4,472,903 A | * | 9/1984 | Hutson | A01K 95/00 43/44.93 |
| 4,644,681 A | * | 2/1987 | Hutson | A01K 93/00 43/44.93 |
| 4,831,768 A | * | 5/1989 | Sorace | A01K 85/00 43/42.05 |
| 6,115,890 A | * | 9/2000 | Silagy | E06B 9/326 24/135 R |
| 6,125,574 A | * | 10/2000 | Ganaja | A01K 91/03 24/136 L |

(Continued)

FOREIGN PATENT DOCUMENTS

GB       1574292 A * 9/1980 ............ A01K 93/00

*Primary Examiner* — Monica L Perry
*Assistant Examiner* — Maria E Graber
(74) *Attorney, Agent, or Firm* — Gary P. Topolosky

(57) ABSTRACT

The present invention provides a floating locking device that includes two components that thread together adjacent the external perimeter, and an internal central locking mechanism that includes a compressing closing section and a receiving opening section (male and female) that can lock the device at a desired location on a fishing line.

15 Claims, 16 Drawing Sheets

(56) References Cited

U.S. PATENT DOCUMENTS

| | | | | |
|---|---|---|---|---|
| 6,199,313 | B1* | 3/2001 | Moore | A01K 85/01 43/42.31 |
| 6,591,461 | B2* | 7/2003 | Salentine | A45F 5/004 403/220 |
| 8,276,311 | B2* | 10/2012 | Cowin | A01K 91/03 43/44.87 |
| 8,341,871 | B2* | 1/2013 | Kavanaugh | A01K 93/00 43/44.87 |
| 8,505,232 | B2* | 8/2013 | Reynolds | A01K 93/00 43/44.9 |
| 8,656,634 | B2* | 2/2014 | Farley | A01K 95/00 43/44.92 |
| 8,950,107 | B1* | 2/2015 | Rosenbloom | A01K 95/02 43/44.87 |
| 9,010,016 | B2* | 4/2015 | Cowin | A01K 93/02 43/44.87 |
| 9,686,972 | B2* | 6/2017 | Scopelitis | A01K 93/00 |
| 9,867,365 | B1* | 1/2018 | Rosenbloom | A01K 95/02 |
| 10,694,730 | B2* | 6/2020 | Kissee | A01K 91/06 |
| 11,653,638 | B2* | 5/2023 | Fox | F16B 2/005 43/44.89 |
| 2006/0000138 | A1* | 1/2006 | Druk | A01K 91/053 43/42.19 |
| 2006/0248780 | A1* | 11/2006 | Elliott | A01K 93/00 43/44.9 |
| 2007/0180758 | A1* | 8/2007 | Patton | A01K 95/00 43/44.87 |
| 2010/0281757 | A1* | 11/2010 | Bennis | A01K 93/00 43/44.9 |
| 2011/0283484 | A1* | 11/2011 | Hall | F16G 11/05 29/428 |
| 2012/0000111 | A1* | 1/2012 | Griffin | A01K 85/16 43/42.37 |
| 2019/0289838 | A1* | 9/2019 | Bennis | A01K 91/04 |
| 2020/0068865 | A1* | 3/2020 | Kahl | A01K 95/00 |

* cited by examiner

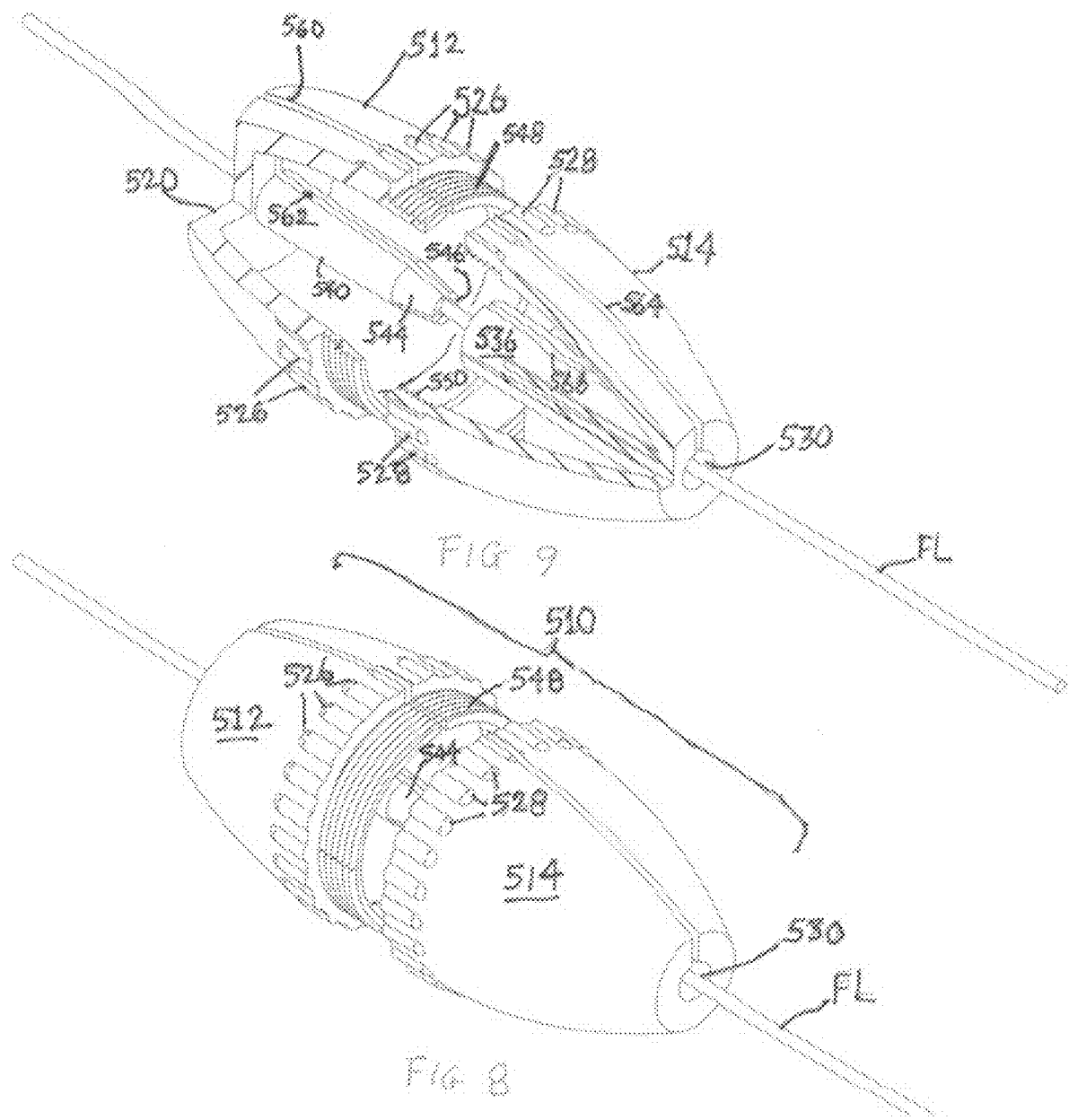

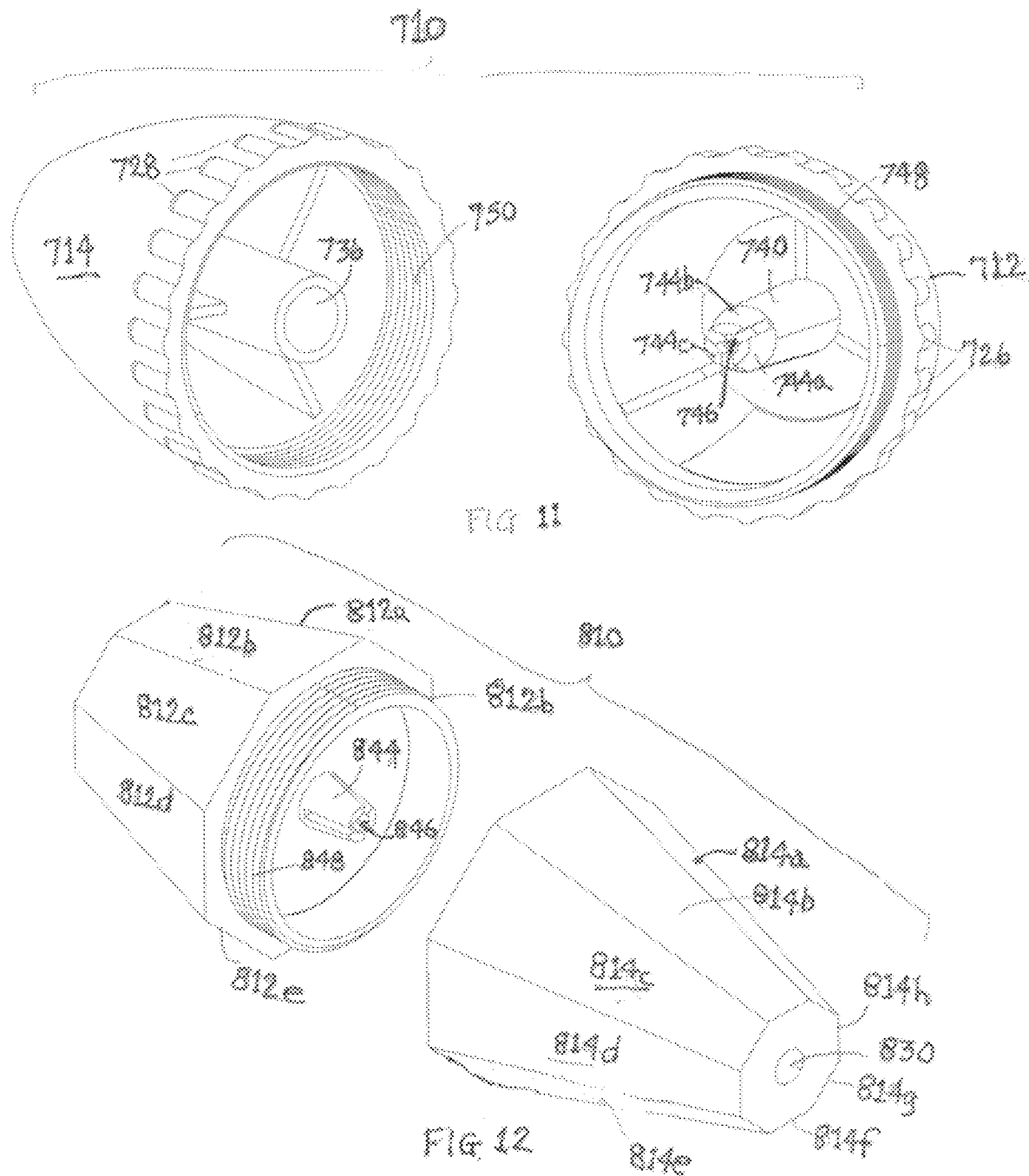

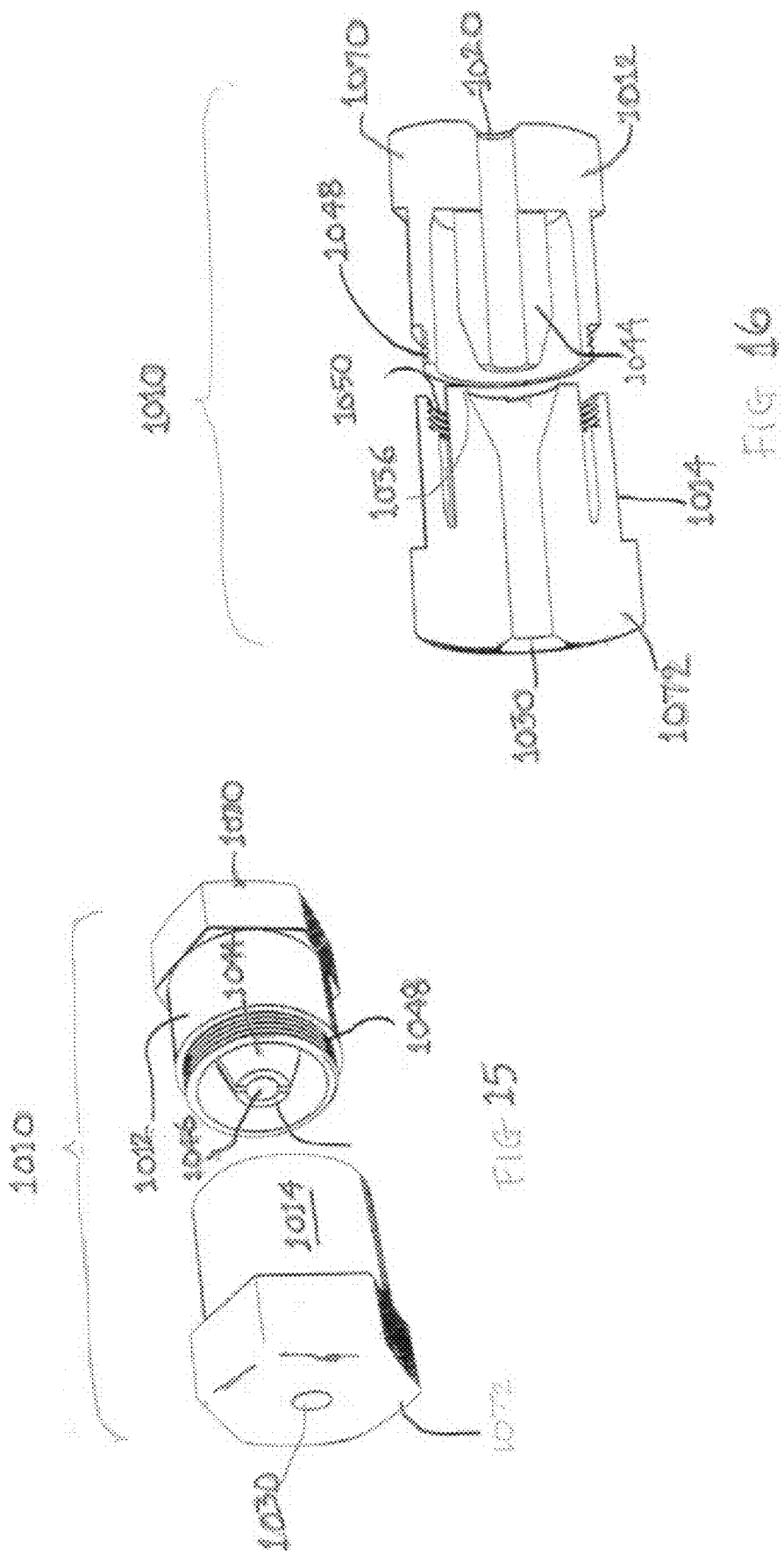

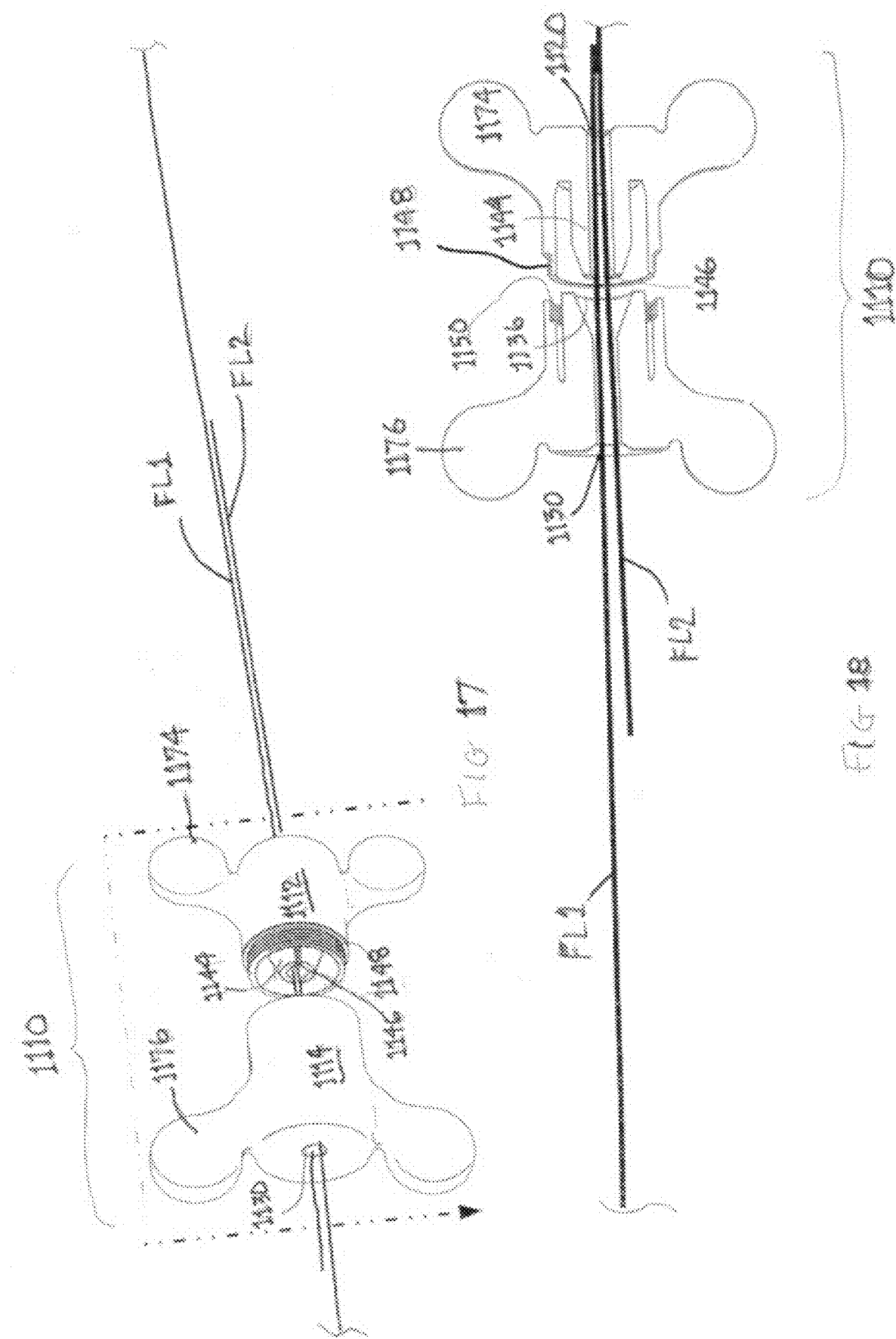

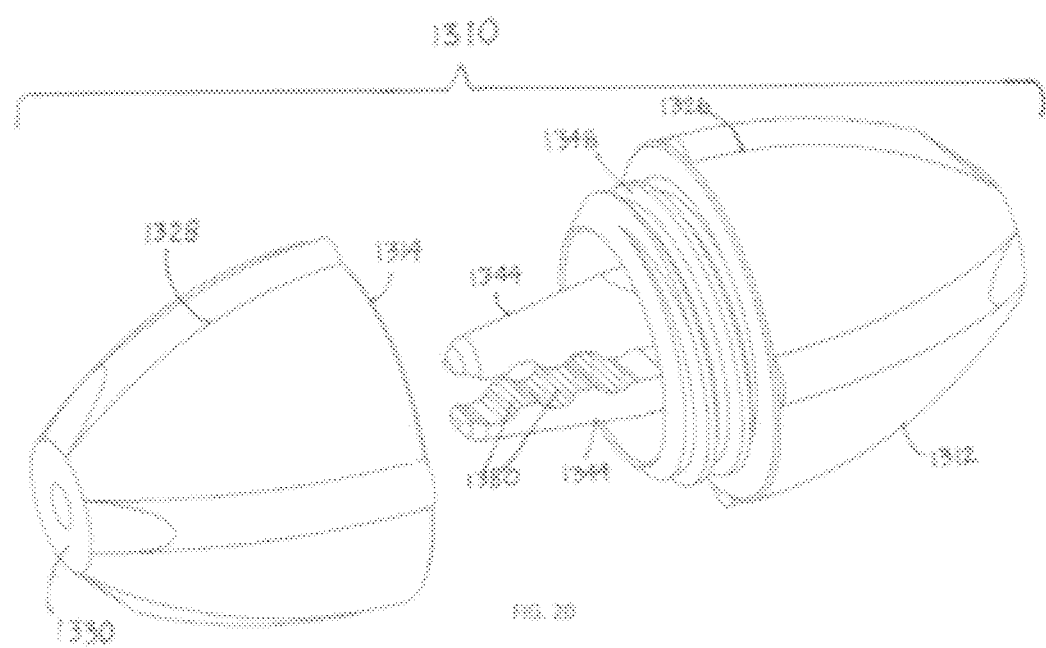

SPRING-FREE FLOATING DEVICE FOR LOCKING ABOUT A FISHING LINE

CROSS-REFERENCE TO RELATED APPLICATIONS

This application is a perfection of Provisional Application Ser. No. 63/400,225, filed on Aug. 23, 2022, the disclosure of which is fully incorporated herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The present invention relates, in general, to a two-part locking device. More particularly, this invention relates to a floating fishing bobber and a non-floating locking device. Versions of these devices are, or will be sold under the brand names Line-Loc™ and Chum-Pop™ and from the homepage: www.line-loc.com.

Prior to the conception and development of the present invention fishing floats, also known as bobbers, strike indicators and popping corks have been widely used in both recreational and commercial fishing for many years. In fact, the first known mention of using a float appears in the book "A Treatyse of Fysshynge Wyth an Angle" written by Juliana Berners in 1496.

Floats serve as a visual bite indicator, they suspend bait at a predetermined depth in the water and as a terminal tackle they add mass that allows the bait to be cast further against air resistance. Due to the buoyancy of floats, they can carry bait to otherwise inaccessible areas of water by drifting along in a prevailing current.

Floats come in different sizes, shapes and colors, and can be made of various materials such as plastic, foam, wood and cork and basic designs include fixed and slip bobbers.

Fixed floats are typically attached to a fishing line using spring loaded mechanisms, using push rod configurations, or, tying your line directly onto the bobber through an eyelet or loop. Spring loaded bobbers include metal hooks that bend, kink and distort the line which creates weak breaking points. Push rod floats include a separate rod that requires a fisherman to push a rod through the center of the float in order to lock the line into place. This is a cumbersome method for changing the depth of your bait. Tying a fishing line directly to a small eyelet of a bobber can be time consuming and tedious, especially in cold weather and low light conditions, and when the depth of the bait needs to be changed frequently in order match fishing conditions.

A slip bobber is a type of float that includes stops that are attached to a line that allows you to set the depth of your bait and hook. They slide up and down your fishing line, which makes them ideal for fishing in deep water or for suspending your bait at a specific depth. One common method of manufacturing includes turning balsa wood on lathes and assembling multiple components by hand. Another method of making slip bobbers includes mating two parts together with adhesive or by heat welding. In either case the process is labor intensive and accordingly there exists a need for a slip bobber where two halves can simply be screwed together.

There are floats offered on the market that can be used as a fixed/slip bobber but they involve the addition and/or removal of bobber stops, which can be difficult and time consuming, and, they include spring-loaded mechanisms that can create weak points in the fishing line when distorted. Hence, there exists a need for a fixed/slip bobber that the user can simply twist in order to lock it onto a line or leave it loose so the line freely slides through the center.

Chumming is a common practice and is defined as dumping bait or something into the water to attract fish. Chum/fish attractant dispensers, bobbers and lures are available but they all include an eyelet or loop or a spring-loaded mechanism, which are fixed configurations, in order to attach them to your line. Accordingly, a chum bobber and even a popping cork is needed that allows the user to quickly re-position the depth of a lure or live bait on a line.

(2) Description of Related Art Including Information Disclosed Under 37 CFR 1.97 and 1.98

Prior to the conception and development of this invention, bobbers, floats and indicators have been widely used for fishing for many years. Basic designs include fixed and slip bobbers. Conventional bobbers are placed on a line with spring loaded metal hooks that tend to distort or otherwise bend the line around a sphere creating a weak breaking point in the line itself.

Others have created fishing bobbers that generally use a fixed or sliding method of engaging with the fishing line.

Irwin U.S. Pat. No. 2,895,255—discloses a fishing float that uses a recessed spring-loaded hook on the bottom to fix it in place anywhere along a fishing line. The hook locks in and bends the line at approximately a 90 degree angle creating a weak point in said line.

Schneider U.S. Pat. No. 3,866,346—discloses a fishing float that uses a spring on one end that pinches and holds the line in a notch to fix it in place anywhere along a fishing line. The notch locks in and bends the line at approximately a 180 degree angle creating a weak point in said line.

Bondus U.S. Pat. No. 3,744,176—discloses a casting bubble that includes a stopper and an inner stretchable material that frictionally clamps onto a fishing line by means of a twisting action. Twisted line can lead to knots and unwinding the inner stretchable material, re-adjusting the depth, and, re-winding is time consuming.

Reynolds U.S. Pat. No. 8,505,232—discloses a lighted slip fishing bobber with threaded halves that seal to allow an electrical device to be able to function when floating in the water. Because of the central tube, the Reynolds device can only function as a slip bobber.

Kavanaugh U.S. Pat. No. 8,341,871—discloses a bobber that includes a longitudinal slot and tabs as a closing mechanism on each end that allows the line to freely slip through said bobber. Additional stops are required to attach to the line making this strictly a slip bobber.

Scopelitis U.S. Pat. No. 9,686,972—discloses a fishing float that includes a vertical slot and an external push button with a biased internal clamping mechanism that includes three springs. The '972 patent does not disclose a float that can be configured without springs. Additionally, there is the potential that the exterior protruding push button may snag on structures in the water.

Kissee U.S. Pat. No. 10,694,730—discloses a leader line spooling device that allows the length of a leader line to be adjusted. Also referred to as a fishing cork this device accommodates a variety of fishing line accessories and includes a spool on one end that works by winding an amount of leader line onto or off the spool. Winding and unwinding the fishing line tightly could create a weak point in the line. It is also time consuming.

Fox U.S. Pat. No. 11,653,638—discloses knotless coupler arrangements for attaching fishing implements to fishing lines and although this is an extensive patent that includes many variations the terms float, bobber, indicator and cork is not referred to. In one aspect, a nut is attached to the front lure which extents proximally beyond the body portion. The threaded portion, nut, of the implement is located at the head portion. The present invention, by contrast, discloses connecting threads integral to the housing that can be located at one of the many positions along the body. Although referred to as a fishing implement in '638, it is essentially a fishing lure that includes hooks, said lure intended to bear the force of a caught fish. In '638, the main feature is that the lure is easy to attach; the main feature of this invention is a device that is easy to adjust.

Elliot US Published Application No. 20060248780—discloses an adjustable fishing float. A cap that includes an internal collet is revealed which is exterior to the float. As stated in the Fox patent, we disclose a threaded portion that is integral to the housing. Additionally, the gripping means disclosed in ours reflects a larger surface area.

Bennis US Published Application No. 20100281757—discloses a two-part slip bobber and method of assembly. This device includes internal mating tubes where one smaller diameter tube can slide into a larger diameter tube or the mating tubes can be configured to threadedly mate. In either case the final process is to ultrasonically weld the two halves together. We disclose one or more singular tubes that extend the entire internal length and an external threaded portion that does not get glued or welded so we can create kits using variations in length and colors.

Kahl US Published Application No. 202000068865—discloses a retrievable chum dispenser that includes a lower housing shell and upper housing shell that includes a loop. The housing includes different specific gravities so the dispenser can float or sink. We disclose different specific gravities by the addition or deletion of an amount of weight. Since '865 includes a loop a depth adjustment can only be attained by un-tying and re-tying a knot. We disclose device where the depth adjustment can be achieved with a twist of the upper and lower housings.

Bennis US Published Application No. 20190289838—discloses a method of assembly of combined fixed and slip bobber. This invention includes multiple stem parts that can be configured to create slip or fixed bobbers. It also includes spring loaded notches and springs that can distort and weaken the line. We disclose a combination fixed/slip bobber that can be twist locked onto the line making it a fixed float, or, left in a somewhat untwisted position so the line can freely slide through the center making it a slip float.

BRIEF SUMMARY OF THE INVENTION

The present invention includes an internal in-line locking mechanism for easy placement, locking, un-locking, adjustment, and re-locking after the positioning of a floating device onto a fishing line. The line passes through the float and a hook with bait or a lure is then attached to the line and suspended below the device. It provides a floating fish indicator device that includes two housing components which thread together around the external perimeter with an internal, centrally located mechanism that has a closing section and a receiving opening (male and female) for locking at a desired location about (or onto) said fishing line.

In a first alternative version, it can lock onto a fishing line in a leak-proof fashion to permit electronics to be housed inside.

In another alternative version, the locking device is either floating or non-floating and can be used to lock two or more lines/tubes-hoses/cords together (i.e., in place).

In another alternative version, the locking device is non-floating and can be used as a shut-off valve for air or fluids going through a flexible tube.

It is one of the primary objects of this invention to provide a fixed fishing floating device where the line is inserted INTO a first end, through a centrally located male/female locking mechanism, and, then OUT through a second end that the user can then twist lock the two housing components together in place at a desired location on the line.

An additional objective is to provide a fixed fishing floating device where the line is placed in an elongated slot along the entire length into the center of the floating device. The user can then twist lock in place at a desired location on the line passing therethrough.

Another objective is to provide a floating fishing device that does not require the need for having to tie knots.

Another objective is to provide a slip floating device that includes bobber stops (not shown in the drawings) that get attached to the line above and below the float. The slip float includes one or more female internal halves and excludes the male closing section, allowing the line to freely slide through the center.

Still another objective is to provide a slip floating device where the line is placed in an elongated slot along the length of the float that includes bobber stops (not shown in the drawings) that get attached to the line above and below the float. The slip float includes one or more female internal halves and excludes the male closing section, allowing the line to freely slide through the center.

Another objective is to provide a combination fixed/slip floating device that the user can either:
 (a) twist to lock the two halves in place at a desired location on the line; or
 (b) leave looser so the line freely slides through the center to make a slip floating device.

Yet another objective is to provide indentations, protrusions or handles around the outside of the device to enable the two halves to be gripped more effectively.

Another objective is to provide a floating fishing device with connecting external threads that can be located at one of many positions along the body of the device. In some cases, for facilitating the placement of optional internal components.

Another objective is to provide a floating fishing device that include an internal, centrally located locking mechanism that has a compressing closing section and a receiving opening (male and female) for locking onto a line that can be located at one of many positions along the body of the device.

Still another objective of the floating fishing device is to prevent bending, distortion and kinking of the line by providing an elongated male compression surface that eliminates pinch points and locks the device onto the line.

Another objective is to provide sufficient clamping force that will prevent the device from slipping on the line while casting.

Another objective is to provide a floating fishing device that can be used with and capture different diameter lines.

Yet another objective is to provide different sized and shaped floating fishing devices that will accommodate all types and sizes of fishing lines for different types of fishing and sizes of fish.

Another objective is to provide a floating fishing device where the diameter of the holes at the end of the device are larger than its internal diameter holes to ensure the line gets centrally located in the male/female locking mechanism.

Another objective is to provide a floating fishing device that can tightly engage with a line or cord yet still provide access to a water-proof chamber for holding electrical or electronic components.

Still another objective is to provide a floating device, or even one that can be submerged in the water, that can tightly engage with a fishing line that includes exterior elongated slots or openings and an interior compartment for the insertion of chum or fish attractant.

Another objective is to provide a floating fishing device made of a singular material or multiple combinations of different materials.

Another objective is to provide a floating fishing device that is less prone to helicoptering and getting tangled than currently made and sold floats.

Yet another objective is to provide a floating device with the ability, after installation, to be quickly re-positioned on the fishing line.

Another objective is to provide a secure attachment to a line or cord that uses rotation to compress a centrally located locking mechanism and prevent its movement along a line or cord.

Another objective is to use the two housing components of the floating fishing device for creating kits that include different lengths, sizes, shapes and colors for creating multiple configurations of the device.

Yet another objective of the floating fishing device is to create kits that include various internal components such as different sized beads and weights made of various materials in order to make different sounds.

Another objective of the floating fishing device is to have interchangeable weights that can be added or removed and used in various combinations to accommodate different buoyancy conditions.

Another objective of the floating fishing device is to include various fastening means for the internal weights and washers such as adhesive or a friction fit.

Another objective of this invention is to make such devices from a plurality of materials including but not limited to: a polymer, nylon, metal, wood, foam and combinations thereof. Representative metals include: aluminum, steel and their respective alloys.

In addition to the various objects and advantages of the present invention described above, it should be obvious that additional objects and advantages of the present invention will become more readily apparent to those persons who are skilled in the relevant are from the following and more detailed description of the invention, particularly, when such descriptions taken in conjunction with the attached drawings and figures.

BRIEF DESCRIPTION OF THE SEVERAL VIEWS OF THE DRAWING(S)

Further features, advantages and objectives of this invention will become clearer from the following Detailed Description made with reference to the accompanying drawings in which:

FIG. 8 is a side perspective view of a sixth embodiment, more bullet shaped, with a fishing line inserted therein through a slit extending through both the upper and lower housing components;

FIG. 9 is a sectional perspective view of the slitted sixth embodiment shown in accompanying FIG. 8;

FIG. 11 is a perspective view of an eighth embodiment showing the two components for a bullet-shaped device, the male element thereof comprised of three prongs;

FIG. 12 is a perspective view showing a ninth embodiment wherein the two main components are polygonal for easier joining and separating about a fishing line (not shown);

FIG. 15 is a perspective view of an eleventh embodiment of device in which both upper and lower housing components having a hexagonal shaped head element for assisting with easier joining and separating (or unjoining);

FIG. 16 is a sectional view of the hexagonal head variation depicted in accompanying FIG. 15;

FIG. 17 is a side sectional view of a twelfth embodiment of device, both upper and lower housing components having thumb tabbed joinder assists;

FIG. 18 is a perspective view of the twelfth embodiment of FIG. 17 with a pair of fishing line sections extending therethrough;

FIG. 19 is a sectional view of a thirteenth embodiment of device having an elongated female compression section extending from a housing component but no male compression section equivalent per se; and FIG. 20 is a perspective view of fourteenth embodiment wherein the two prongs of the male compression section are provided with crimping teeth.

DETAILED DESCRIPTION OF THE INVENTION

Figure 1:
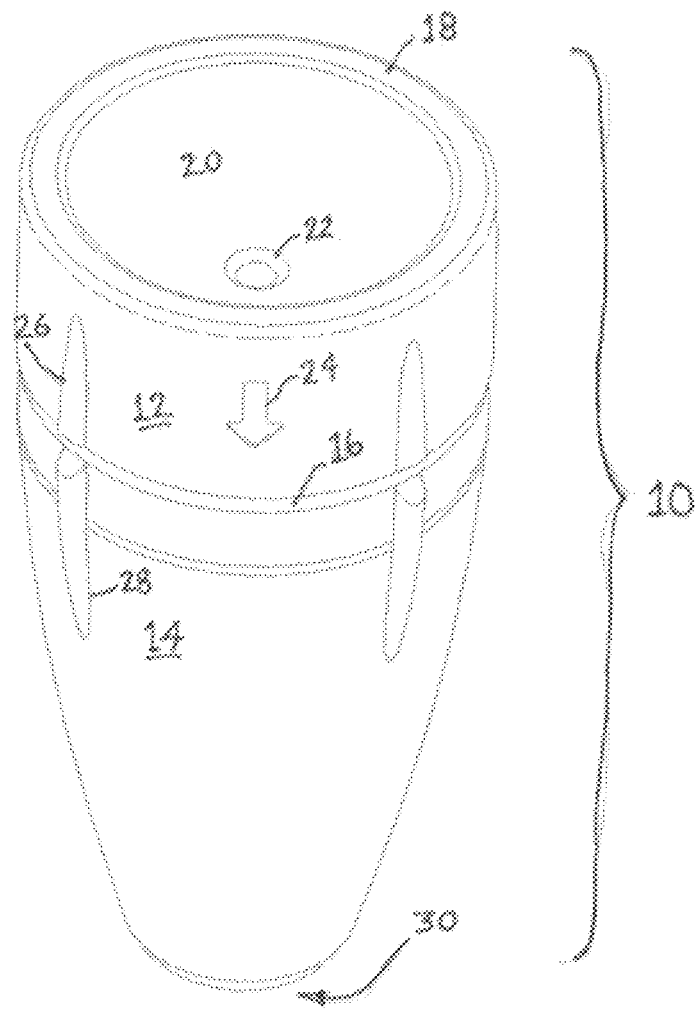
FIG. 1 is an upper side perspective view of one embodiment of this invention having a concaved, upper outer face and a directional arrow.

Prior to proceeding to the more detailed description of the present invention it should be noted that, for clarity and understanding, very similar components which have identical functions have been identified with identical reference numerals throughout the several views, though typically in the next hundred series. Furthermore, the various embodiments hereof are shown as divided into two main components/sections/physical parts. Sometimes they may be loosely referred to as "halves" though they may not be equally sized (by weight, height, material used, etc.). They may also be described (and claimed) as two main elements, a male and female section or possibly even into an upper and lower housing component.

It is believed that for this invention to work, i.e., grip onto a desired segment of fishing line, two interactions should happen. First, the tapered male prongs go into the tapered female shaft (receiver). This tapering, male to female, is what creates the gripping force necessary for the male prongs to lock onto the fishing line. Secondly, the threads about the perimeters of the two main housing components, when they are twisted together, will serve to pull the male and female, centrally located tapered sections together thus locking the male prongs onto the fishing line. They are co-dependent on one another and must occur at the same time. They work in conjunction to affix this fishing device to the desired spot/s on the line proper.

Referring now to FIG. 1, there is shown a first embodiment of device, generally 10, with its main elements being a first (or most often "upper") housing component 12 and a second, or lower housing component 14 beneath. Preferably, to make the two components watertight, they are joined together about a central O-ring 16.

At a top end 18 of this device as shown, there is provided an inwardly curved, or concave face 20. With such purposeful curvature, the device is more likely to attract fish when being popped or jerked at intervals, concave face forward, through the water.

Note that the device 10 is specially designed to accommodate inserting a fishing line therethrough. Line is fed into a top aperture 22, through the main body of device 10 and then out the bottom aperture 30. If it is a full female internal slip bobber (per FIG. 19), one could feed fishing line through the bottom; but it should otherwise be only fed in the direction of the direction indicator, or arrow 24.

Preferred embodiments of this invention are also illustrated in FIG. 1. Particularly, the exteriors to both upper housing 12 and lower housing 14 are shown having outwardly protruding surface extensions, items 26 and 28, respectively. They assist the device user with both tightening the two components together and loosening them apart.

Figure 2:
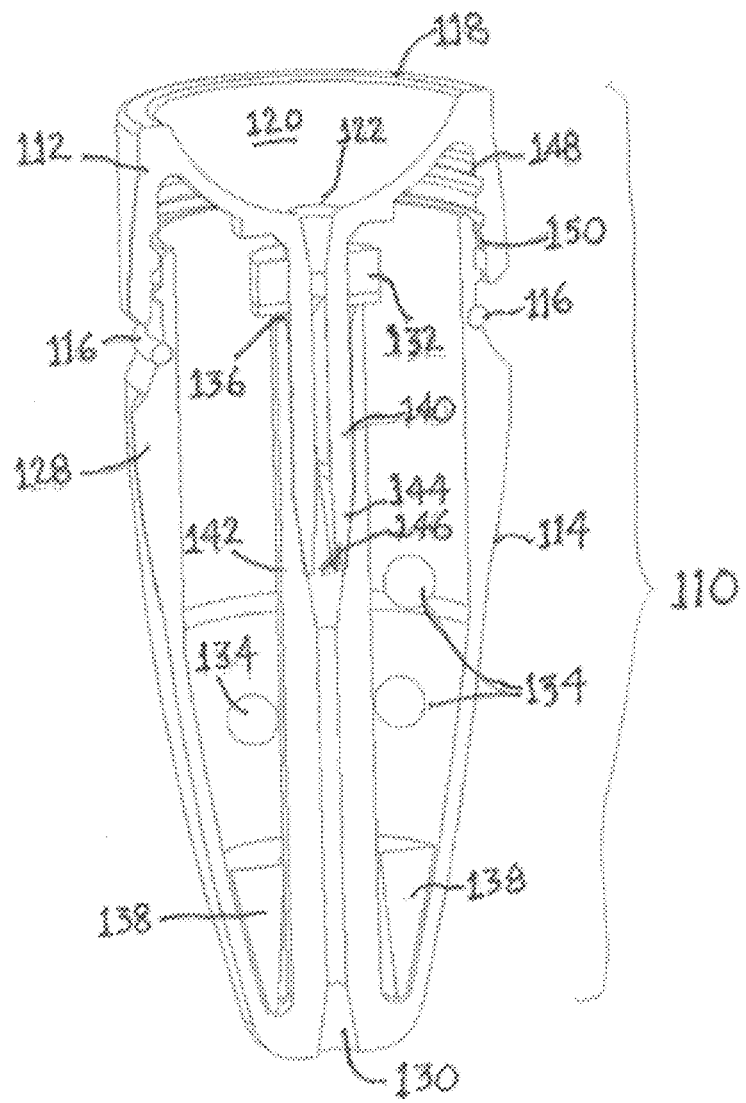
FIG. 2 is a cross sectional view of a second embodiment showing the internal washers, O-ring, weights and/or bead noisemakers therein.
Figure 3:
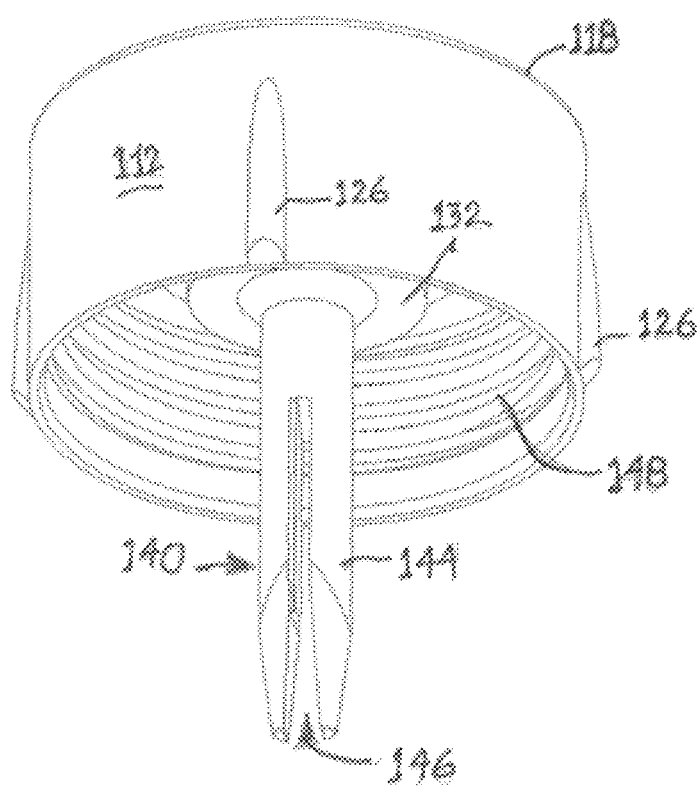
FIG. 3 is a top perspective view of the upper housing component to the floating device depicted sectionally in above FIG. 2.
Figure 4:
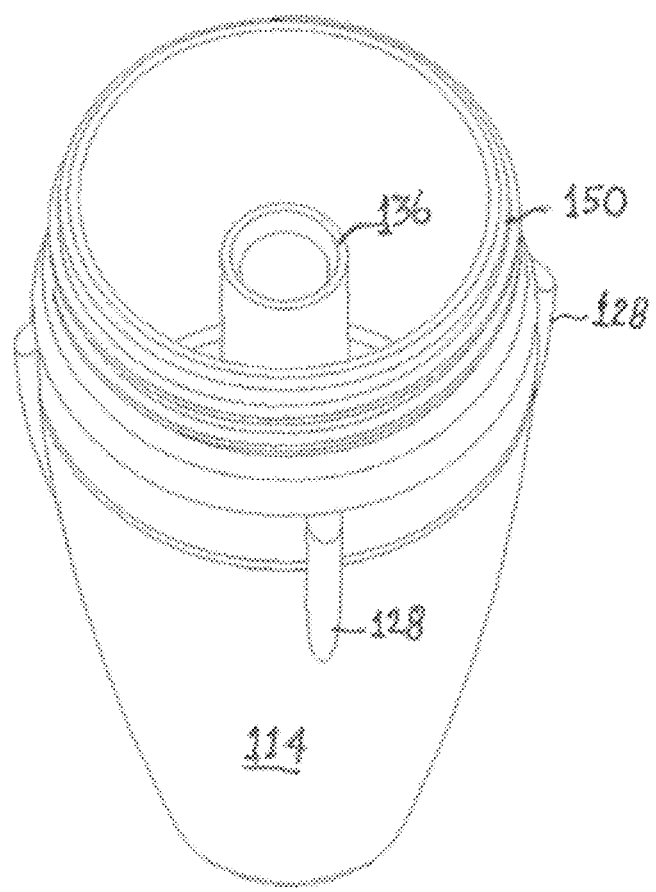
FIG. 4 is a top perspective view of the lower housing component to the floating device depicted sectionally in above FIG. 2.

FIGS. 2 through 4 show a second embodiment of device, now numbered 110 with its own upper housing 112 and lower housing 114. Other elements common to that shown in FIG. 1 are commonly numbered though in the next hundred series. Still other features/components in these sectional (FIG. 2) and perspective views (FIGS. 3 and 4). Notably, upper housing 112 has an internally threaded section 148 for mating with the externally threaded section 150 of lower component 114, with both components being joined about a common O-ring 116 for water tightness.

Within the current configuration depicted, upper component 112 has a "male" compression member 140 extending downwardly and inwardly therefrom, said male member including two or more prongs 144 (two are shown here) that terminate in a central prong aperture 146 through which a section of fishing line is meant to extend. Conversely, lower housing 114 has its mated female compression member 136. It should be noted that the component/section labels may also be flipped without detracting from the value of having a floating unit made up of TWO main housing components that interact and join together about a section of fishing line (not shown in this view).

Further in these views, additional preferred though not necessarily mandatory "options" are also shown. Particularly, this embodiment includes an uppermost rubber washer 132 and plurality of beads (i.e., noisemakers) which can also serve as weighted elements, depicted as balls 134. Lead weights, like the donut-shaped unit 138 at the base of lower housing 114 can be left loose, adhered into place or friction fit into place.

Figure 5:
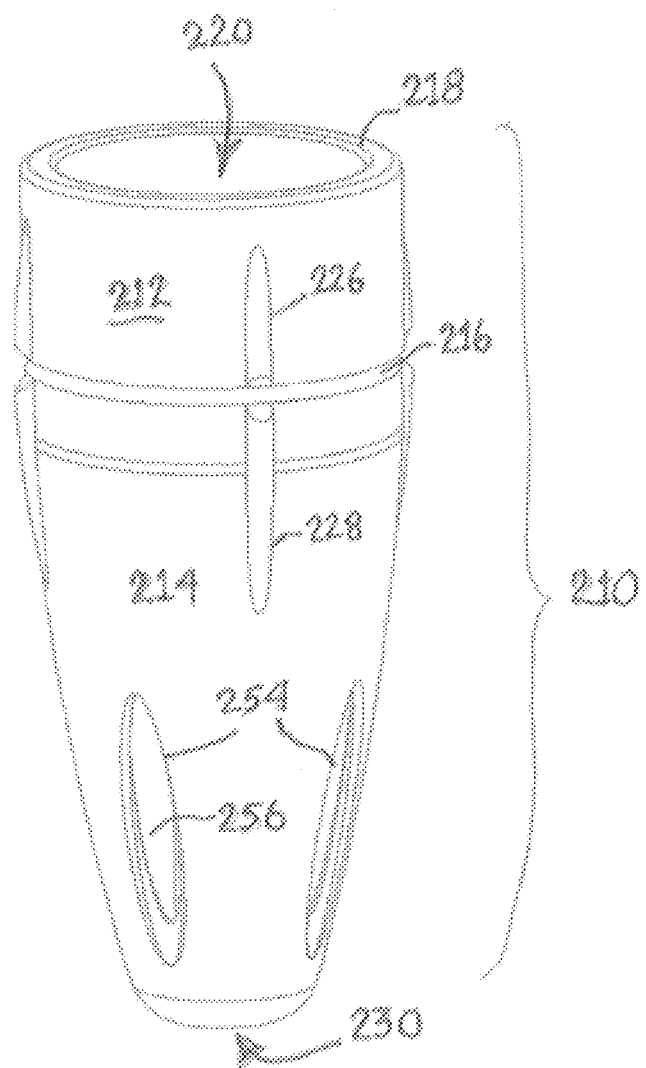
FIG. 5 is a side perspective view of a third embodiment showing a plurality of slotted chum slits in the lower housing component.

FIG. 5 is quite similar to the preceding embodiment except that it has purposefully added to the lower housing component 214 of device 210, a plurality of elongated slots 254 through which a chum component, generally 256, may leak out for assisting the user with bringing/baiting fish to this floating device. It should be noted that later on, in FIGS. 13 and 14, slotted chummers are replaced with spherically shaped, aperture versions, item 954 therein.

Figure 6:
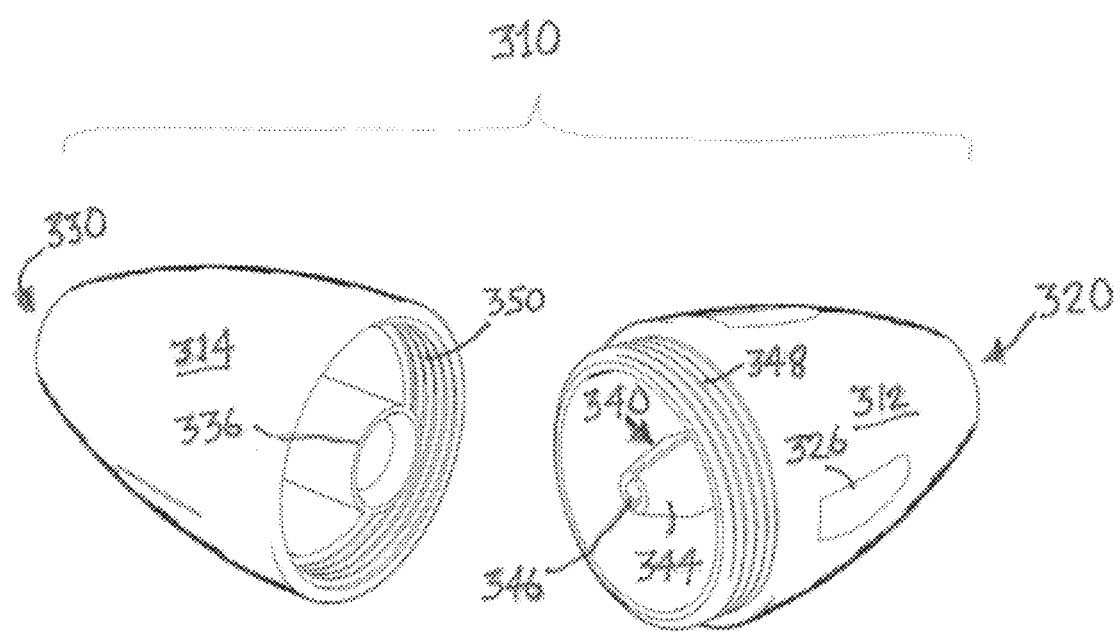
FIG. 6 is a perspective view of the two housing components to a fourth embodiment having a two-pronged male compression section, said two prongs forming a centrally located line aperture therebetween.

FIG. 6 illustrates an alternative profile for its device 310 that is more equally sized and shaped. Hence, the two housing components 312, 314 resemble more of a left half, right half that are brought together and joined about a section of fishing line (not shown). In FIG. 6, it should be noted that the male compression component 340 has two distinct prong halves 344 that defined a more pronounced central aperture 346 through which line is threaded.

Figure 7:
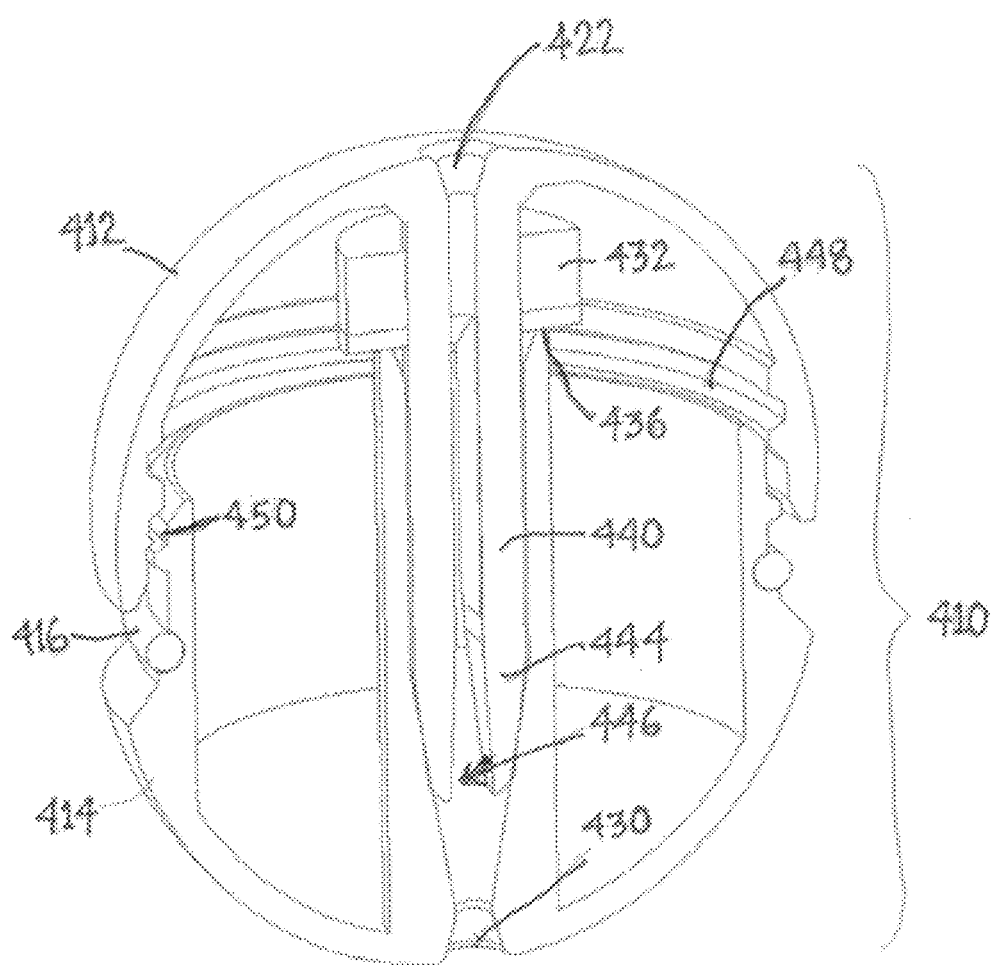
FIG. 7 is a sectional perspective of a fifth embodiment of device according to this invention, said fifth embodiment having more of a spherical exterior when upper and lower housing components are joined together.

In the more spherical version of device 410 depicted in FIG. 7, features common to earlier bullet-shaped versions are still commonly numbered though in the next hundred (the 400's) series. Noteworthy, however, in this version is its inclusion of BOTH a centrally located O-ring 416 . . . AND an upper water tightening washer 432. When the device is truly watertight, electronic elements may be included in the central body though not shown herein per se. Representative electronic elements may include battery-powered lights, sound generators, possibly even GPS locators/tracking means.

FIGS. 8 and 9 illustrate yet another variation of device 510, this time with a representative section of fishing line FL positioned therein/passing therethrough. With other common elements being commonly numbered in the 500 series, the other MAIN distinction of this device variant from earlier versions is its additional of an axially extending slit through which fishing line FL may be passed, possibly even if after the device has been joined together for a first use, slightly loosened for moving to another line location before retightening. In particular, the slitting for line accommodating is best served via respective slits 560 and 562 in upper housing 512 and corresponding slits 564, 566 in lower housing 514.

Figure 10:
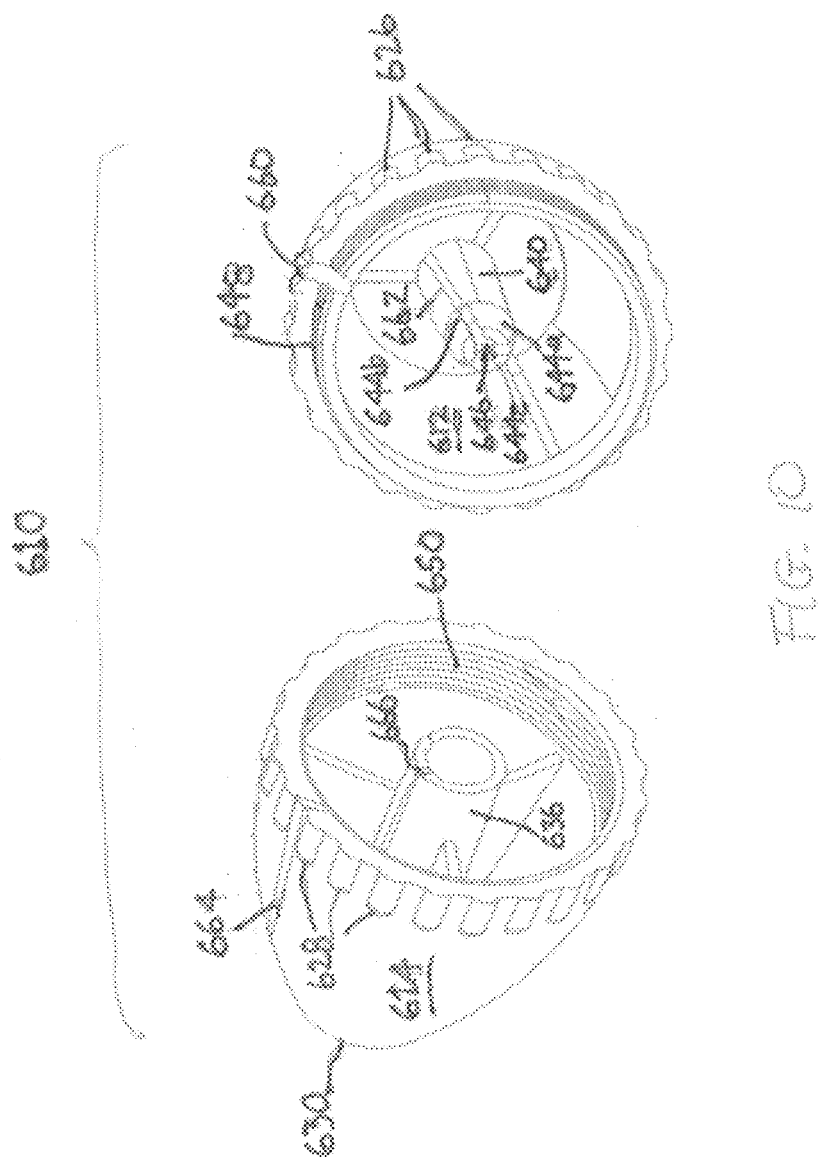
FIG. 10 is a perspective view of a seventh embodiment with the slitted upper and lower housing components disconnected (i.e., unscrewed apart)

In FIG. 10, similar line slitting is shown as items 660, 662 of upper housing 612 and slit components 664, 666 in lower housing 614.

For the version of device 710 shown in FIG. 11, in two open sections, it should be noted that the male prong element within upper housing 712 is actually made up of THREE subelements, 744a, 744b and 744c. But even greater prong quantities (four, or more) of prongs may be used herewith, too.

The version of device 810 shown in FIG. 12 is meant to underscore how overall body configurations can be exploited to better enhance gripping during joinder and separation. Particularly, in this view, an octagonally shaped upper component consists of 812a, b, c, d and e (the others are blocked from view), while its lower components include polygonal sections 814a through 814h.

Figure 13:
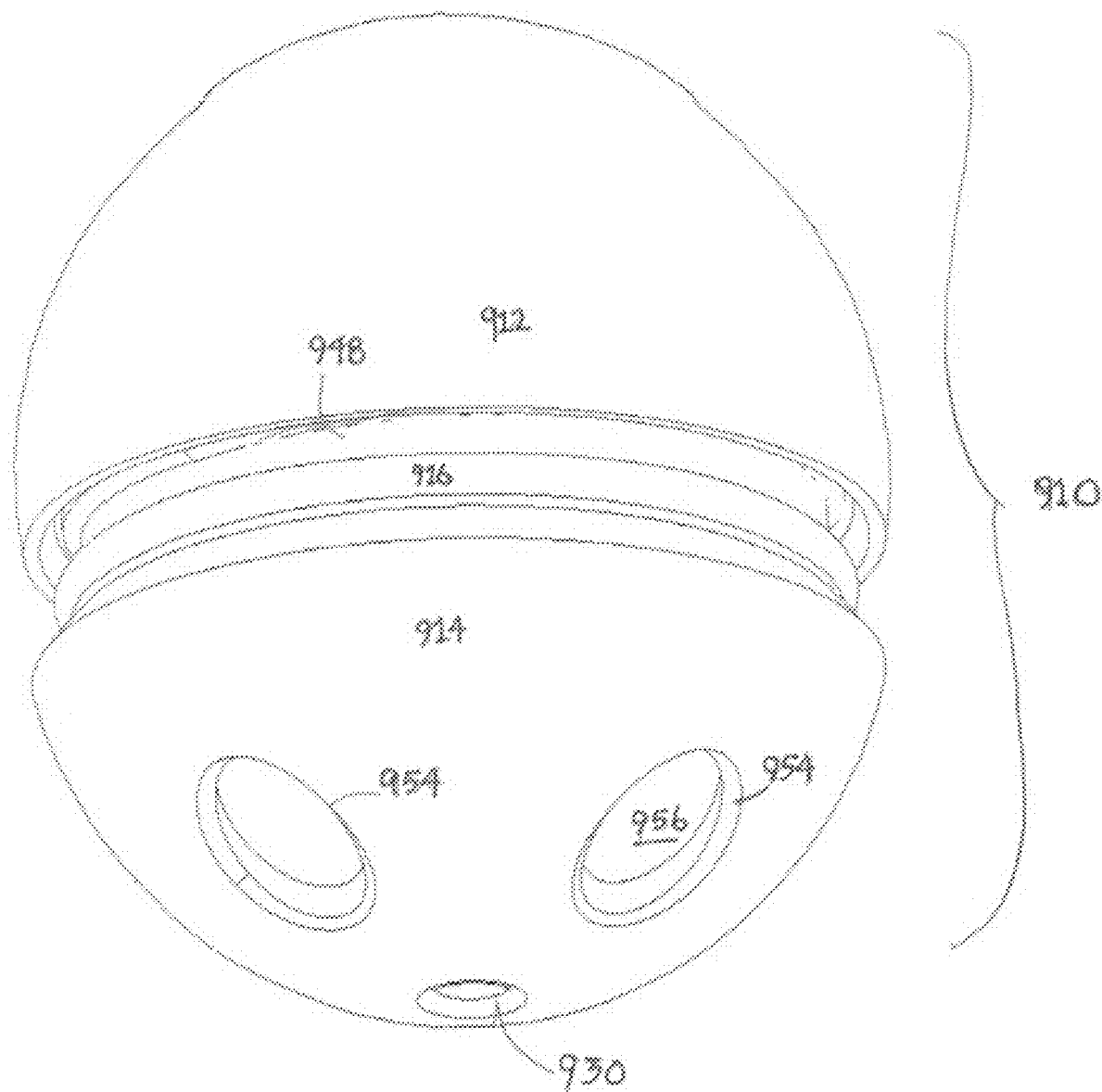
FIG. 13 is a perspective view of a tenth embodiment that is mostly spherical and has a plurality of circular-shaped chum apertures in its lower housing component.
Figure 14:
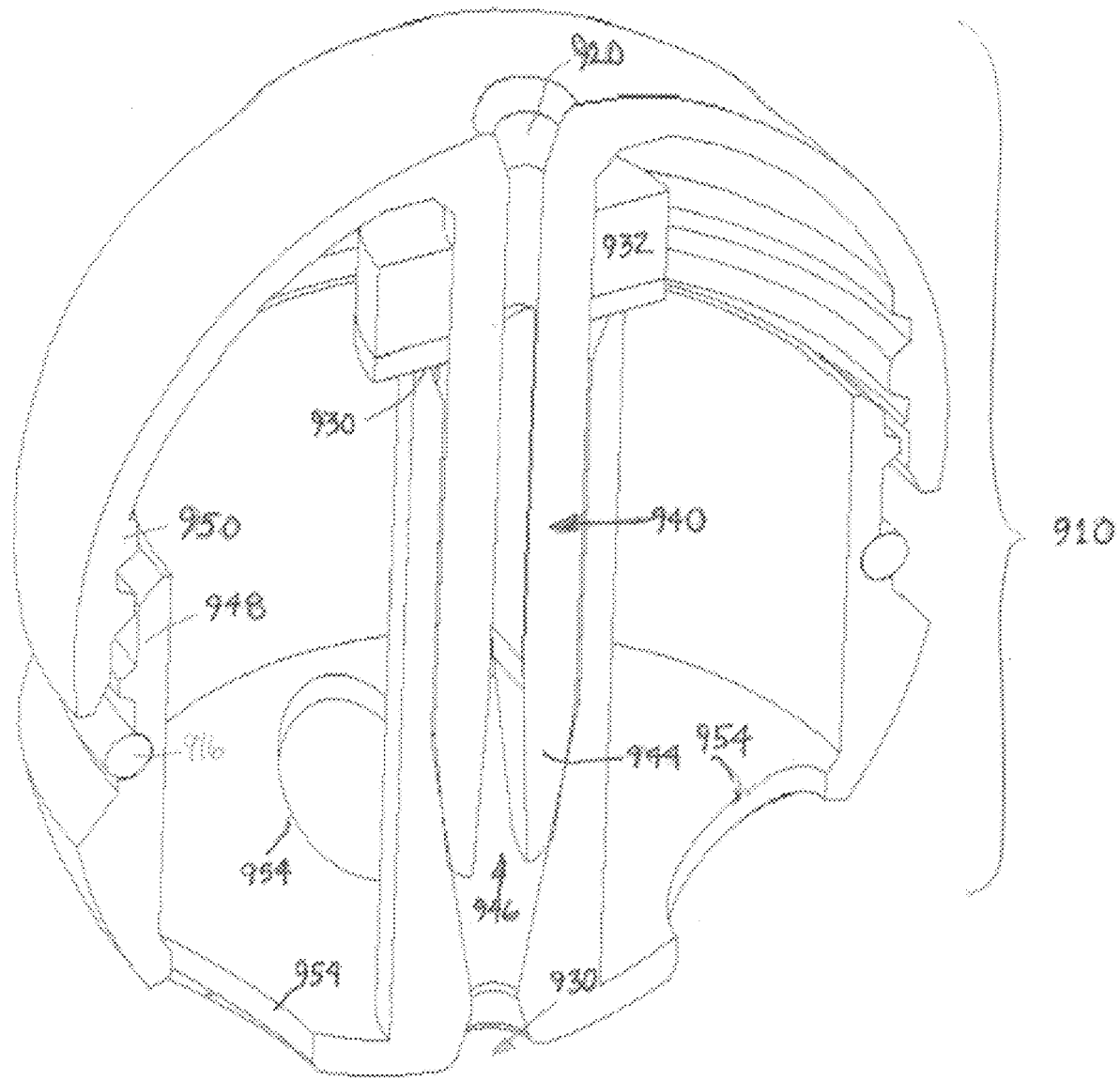
FIG. 14 is a cross sectional perspective view of the spherical chum bobber version depicted in accompanying FIG. 13.
Figure 49:
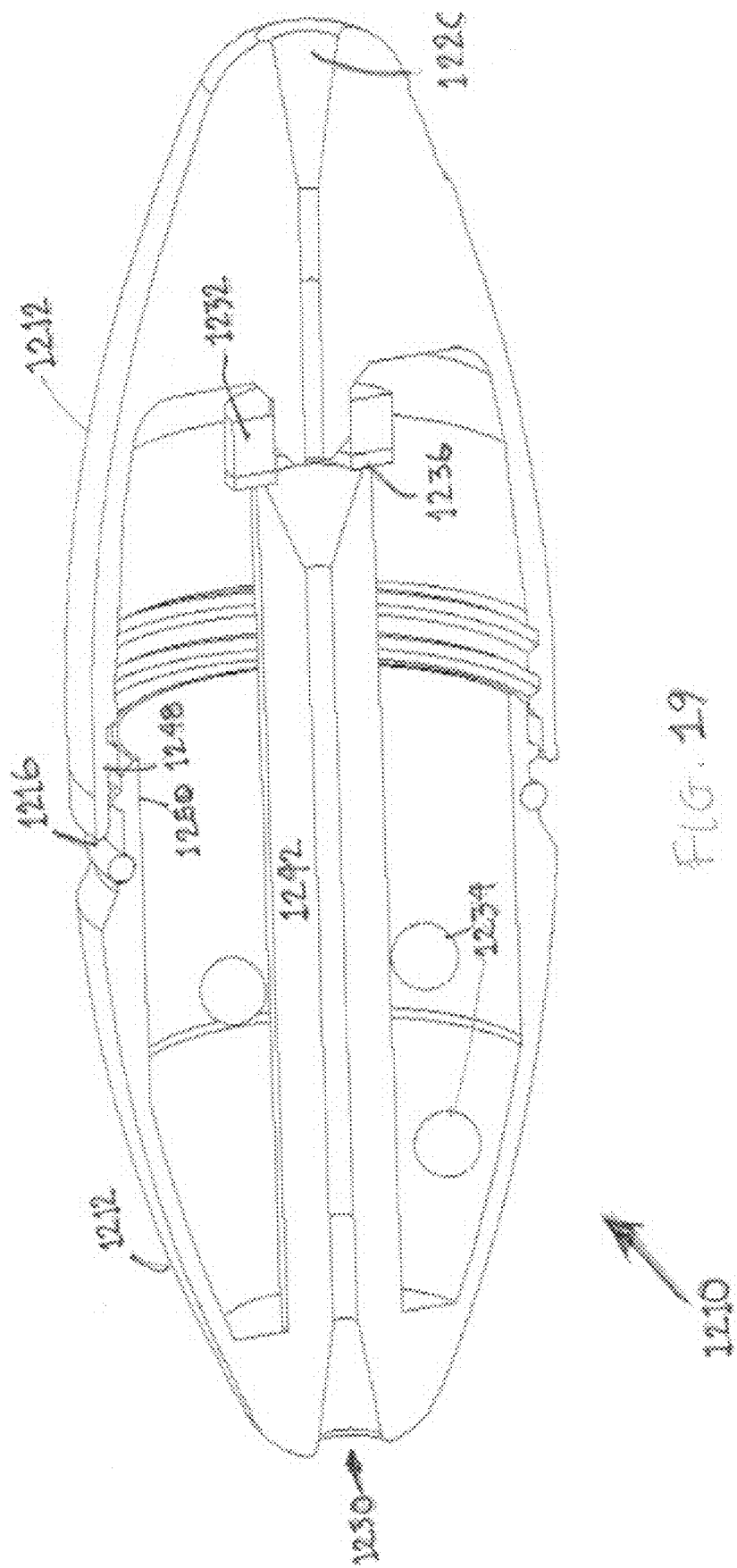

FIGS. 13 and 14 show a spherical shaped device 910 in perspective view, partially assembled (FIG. 13) and sectionally (FIG. 14). As noted earlier, this version of spring-free, floating fishing line locking device also shows an optional variation using circular shaped CHUM apertures 954 through which an added chum element (solid or semi-liquid) may be periodically dispensed when in use.

FIGS. 15 and 16 depict another variation of gripping assists for its device embodiment 1010. Particularly, both outermost ends to upper housing component 1012 and lower housing component 1014 are fitted with hexagonal heads, 1070, 1072 respectively—to assist its user in tightening together or loosening apart the two "halves"—especially when wet and/or cold fishing temperatures prevail.

FIGS. 17 and 18 show yet another variation for device 1110 but for this embodiment both upper and lower housing "halves" 1112, 1114 are provided with wing nut style, thumb twisting "ear tabs" 1174 and 1176. These FIGS also illustrate the possible use of this particular embodiment for tightening about TWO separate fishing lines FL1 and FL2 should that need arise.

In FIG. 19, a variant of device 1910 is shown in which, for a given application, it may not be necessary to include ANY male prong members. Rather the elongated tunnel 1242 for female compression may be sized to abut against just a washer unit 1232 within the head end of top housing component 1212.

Lastly, the device 1310 of FIG. 20 shows a potential variation in which the prong elements 1340 within upper housing component 1312 are purposely fitted with a series of ridged teeth 1380 for better line gripping should a situation warrant.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from the spirit of the invention.

Having described the best modes currently known for practicing this system and method, it is to be understood that the scope of this invention may be further described by the attached claims.

SEQUENCE LISTING

Not applicable.

What is claimed is:

1. A spring-free floating device for locking about a fishing line ending axially through the floating device which comprises:
   (i) a first housing component having an outer perimeter with a first internally threaded section and a first compression section spaced apart from the first internally threaded section, and
   (ii) a second housing component having an outer perimeter with an externally threaded section for mating with the first internally threaded section of the outer perimeter of the first housing component, said second housing component also having a second compression section spaced apart from the externally threaded section, said second compression section for mating with the compression section of the first housing component in a watertight manner, said first compression section and said second compression section adapted for engaging with and at least temporarily locking the device about the fishing line extending axially through.

2. The floating device of claim 1, which has an ability to adjust bait depth without having to tie knots on the fishing line.

3. The floating device of claim 1, wherein at least one of the first housing component and the second housing component is made from a material selected from the group consisting of: a polymer, nylon, wood, metal, cork, foam or combinations thereof.

4. The floating device of claim 1, wherein the first internally threaded section of the first housing component extends upwardly and inwardly from a lowermost edge of the first housing component closest to where the first housing component engages with and connects to an uppermost edge of the externally threaded section of the second housing component, said uppermost edge of the externally threaded section extending from a raised region of the second housing component, said raised region not extending outwardly beyond an outermost surface of the second housing component.

5. The floating device of claim 1, wherein the fishing line extends axially into and through a centermost region of the first housing component and exits a centermost region of the second housing component.

6. The floating device of claim 1, which has a concave face at one end.

7. The floating device of claim 1, which further comprises (iii) at least one of: (a) an O-ring component for positioning between the first housing component and the second housing component and; (b) a washer for positioning within the floating device so that when watertight one or more internal components may be positioned inside; spaced apart regions of the first compression section, spaced apart regions of the second compression section or both spaced apart regions, said internal components selected from the group consisting of: (i) an electronic element, (ii) a sound emitting element, (iii) a noisemaker and (iv) one or more weight elements.

8. The floating device of claim 7, at least one of: (i) wherein the electronic element includes a light emitting element.

9. The floating device of claim 1, wherein the first compression section of the first housing component includes a male element that extends from a first end of the first housing component inwardly toward an open end of the second housing component, and the second compression section of the second housing component includes a female element for receiving at least some portion of the male element of the first housing component when the first housing component and the second housing component are brought together.

10. The floating device of claim 9, wherein the male element includes two or more tapered prong heads and the female element is tapered.

11. The floating device of claim 10, wherein the two or more prong heads of the male element define a central aperture.

12. A spring-free floating fishing line bobber comprising:
(i) a first housing component having an outer perimeter with a first internally threaded section and a first compression section spaced apart from the first internally threaded section,
(ii) a second housing component having an outer perimeter with an externally threaded section for mating with the first internally threaded section of the first housing component, said second housing component also having a second compression section for mating with the first compression section of the first housing component, said first compression section and said second compression section adapted for engaging with one or more sections of axially extending fishing line to at least temporarily secure the bobber thereto and easily change a location of the bobber along the fishing line; and
(iii) to render the device watertight, at least one of: (a) an O-ring component for between the first housing component and the second housing component; and (b) a rubber washer, inside spaced apart regions of the first compression section, spaced apart regions of the second compression section or both spaced apart regions, one or more internal components may be stored, said internal components selected from the group consisting of; (i) an electronic element, (ii) a sound emitting element, (iii) a noisemaker and (iv) one or more weight elements.

13. The floating bobber of claim 12, wherein the electronic element includes a light emitting element.

14. The floating bobber of claim 12, wherein the first compression section of the first housing component includes a tapered male element that extends from a first end of the first housing component inwardly toward an open end of the second housing component, and the second compression section of the second housing component includes a tapered female element for receiving at least some portion of the male element of the first housing component when the first housing component and the second housing component are brought together with the axially extending fishing line engaged between.

15. The floating bobber of claim 14, wherein the tapered male element includes a multi-pronged head.

* * * * *